(12) United States Patent
Stone et al.

(10) Patent No.: US 8,401,892 B2
(45) Date of Patent: Mar. 19, 2013

(54) SYSTEMS AND METHODS OF ANALYZING ACCOUNTS RECEIVABLE AND SALES OUTSTANDING

(75) Inventors: Keith J Stone, Arlington, VA (US); Todd J Sheerman, Olathe, KS (US); David J Santoro, Jr., Yardley, PA (US)

(73) Assignee: Accenture Global Services Limited, Dublin (IE)

( * ) Notice: Subject to any disclaimer, the term of this patent is extended or adjusted under 35 U.S.C. 154(b) by 691 days.

(21) Appl. No.: 11/954,927

(22) Filed: Dec. 12, 2007

(65) Prior Publication Data

US 2009/0157440 A1   Jun. 18, 2009

(51) Int. Cl.
*G06Q 10/00* (2006.01)
*G07B 17/00* (2006.01)
*G07F 19/00* (2006.01)

(52) U.S. Cl. .................... 705/7.39; 705/7.38; 705/7.11; 705/30

(58) Field of Classification Search .................. 705/7.11, 705/7.39, 7.38
See application file for complete search history.

(56) References Cited

U.S. PATENT DOCUMENTS

| | | | |
|---|---|---|---|
| 7,672,858 B2 * | 3/2010 | Tolan et al. ...................... 705/2 |
| 7,725,335 B1 * | 5/2010 | Goodwin .......................... 705/4 |
| 2004/0039619 A1 * | 2/2004 | Zarb ................................ 705/7 |
| 2006/0248010 A1 * | 11/2006 | Krishnamoorthy et al. .... 705/40 |
| 2007/0288367 A1 * | 12/2007 | Krishnamoorthy et al. .... 705/40 |
| 2008/0021822 A1 * | 1/2008 | Hinton et al. .................... 705/40 |
| 2008/0065415 A1 * | 3/2008 | Swain et al. ...................... 705/2 |
| 2009/0157447 A1 * | 6/2009 | Busch .............................. 705/7 |
| 2009/0326974 A1 * | 12/2009 | Tolan et al. ...................... 705/2 |
| 2010/0106589 A1 * | 4/2010 | Etheredge et al. ......... 705/14.25 |

OTHER PUBLICATIONS

Thomas, Stephan, Metrics in Credit and Collection Departments: What are the right ones and how do you implement? Business Credit. V106n10. pp. 54-56. Nov./Dec. 2004.*

* cited by examiner

*Primary Examiner* — Scott Zare

(57) ABSTRACT

Systems and methods are provided to perform an analysis of the accounts receivable of a business. Each component of the accounts receivable is reviewed individually and all factors related to that particular component are accounted for. A data tool is then implemented to analyze the data and to recognize the areas of all of the components that are susceptible to improvement. A strategy is then developed to maximize the efficiency of the accounts receivable.

27 Claims, 10 Drawing Sheets

| Initiative Name | Status Summary | Current Phase | Accomplishments last 45 days | Issues/Risks | Scheduled Implementation |
|---|---|---|---|---|---|
| Metrics Scorecard/ Dashboard | | Design | Developed initial list of key metrics. Reviewed key metrics with all center Operation Teams | Some KPIs may need to be manually created | Feb 17, 2006 |
| Operational Impact Metrics | | Design | Developed initial list of key metrics. Researching data gathering methods & report design. | Automation of data gathering | Mar 1, 2006 |
| Activity Monitoring & Performance Measurement | | Design & Build | Completed Dayton phone activity review. Ascertaining best methods across centers | | Feb 14, 2006 |
| High Balance Collections SWAT-Pareto Program | | Implement-Test | Implemented "pareto" tools & focus. Compiled BP DRO/DBO data from November | Ability to efficiently institutionalize to delivery centers | Feb 24, 2006 |
| High-Balance Invoice Confirmation | | Design & Build | Identified expanded key data to extract more comprehensive status | | Feb 10, 2006 |
| Global Collections Prioritization Matrix | | Not Started | | Driven from Customer segmentation data in Oracle, EDW | Mar 17, 2006 |
| Collector Incentive Program | | Design / Trials | Initiated expanded use of incentives. Program specs in design | | Mar 10, 2006 |
| Do Not Call Review | | Analysis / Design | UK volumes and instances gathered, impact being assessed | Sales leading collection efforts may give special non-policy allowances | Feb 10, 2006 |
| Initiative Name | Status Summary | Current Phase | Accomplishments last 45 days | Issues/Risks | Scheduled Implementation |
| Write Off Policy Review | | Design | Researched best practices, reviewed current process, drafted recommendations | | Feb 10, 2006 |
| Escalation Protocol Adherence | | Design | Researching cross center capabilities and utilization of Access tool | Tool implementation timeframe/costs relative to collection workstation capabilities | Mar 03, 2006 |
| Credit Policy Adherence | | Design & Build | Compiled "as is" credit process and metrics, assessing impact to AR performance | Inclusion of past due AR component to Order Hold and BU acceptance | Feb 26, 2006 |
| Small Balance Clean Up | | Design | Reviewing use of specialized letter campaigns across Prague and Bangalore centers & cost effective calls | | Mar 10, 2006 |
| Credit Balance Clean Up | | Design | Root cause analysis in-progress, as well as operational campaigns coordinated at centre levels to clear items | Many root cause improvement opportunities involve invoicing and required IT support to automate | Mar 24, 2006 |
| 3rd Party Collection Strategy | | Design & Build | Researched current 3rd party agencies used in other BPO deals, working with India to create pilot with UK | May need business unit sign off for each invoice that will be sent to 3rd Party | Feb 15, 2006 |

Figure 7

| Initiative Name | Status Summary | Current Phase | Accomplishments last 45 days | Issues/Risks | Scheduled Implementation |
|---|---|---|---|---|---|
| Write Off Policy Review | | Design | Researched best practices, reviewed current process, drafted recommendations | | Feb 10, 2006 |
| Escalation Protocol Adherence | | Design | Researching cross center capabilities and utilization of Access tool | Tool implementation timeframe/costs relative to collection workstation capabilities | Mar 03, 2006 |
| Credit Policy Adherence | | Design & Build | Compiled "as is" credit process and metrics, assessing impact to AR performance | Inclusion of past due AR component to Order Hold and BU acceptance | Feb 26, 2006 |
| Small Balance Clean Up | | Design | Reviewing use of specialized letter campaigns across Prague and Bangalore centers & cost effective calls | | Mar 10, 2006 |
| Credit Balance Clean Up | | Design | Root cause analysis in-progress, as well as operational campaigns coordinated at centre levels to clear items | Many root cause improvement opportunities involve invoicing and required IT support to automate | Mar 24, 2006 |
| 3rd Party Collection Strategy | | Design & Build | Researched current 3rd party agencies used in other BPO deals, working with India to create pilot with UK | May need business unit sign off for each invoice that will be sent to 3rd Party | Feb 15, 2006 |

Figure 8

SYSTEMS AND METHODS OF ANALYZING ACCOUNTS RECEIVABLE AND SALES OUTSTANDING

FIELD OF THE INVENTION

The present invention relates generally to systems and methods for analyzing a companies accounts receivable and day sales outstanding. More particularly the present invention relates analyzing individual categories of a business' intake and improving the overall profitability of its accounts receivable.

BACKGROUND

It is well known in the art that businesses have a day sales outstanding. The day sales outstanding for any business will be totaled at the end of a business cycle and will include figures for all sales, transactions, incoming monies, extended credit, lay-overs, etc. applicable to the period of time being measured. The aggregate of these numbers (some of which can be positive and some of which can be negative) represents what can be known as the day sales outstanding. For any organization, the day sales are an important statistic in evaluating the performance of a company.

Trends in the days sales outstanding versus a competitor are typically suggestive to the investment community. For example, when the days sales outstanding is decreasing versus competitors, companies are viewed as premium suppliers and can often negotiate better terms of trade and not require extensive financing. However, when the days sales outstanding is increasing versus competitors, companies may be viewed as losing premier positions within the marketplace with customers placing them in secondary positions to others.

It is known that in evaluating the cash intake of an organization, there are many assumptions made and credits extended that may not ever be paid back. As such, it would be advantageous to quantify not only the inefficiency of the current cash flow systems, but also recognize the individual areas of inefficiency and improve upon those areas to ensure that any inefficiencies are eliminated.

BRIEF SUMMARY OF THE INVENTION

In accordance with a first aspect, a system is provided for improving the days sales outstanding performance of an organization. The system includes analyzing an accounts receivable base that includes key components to the days sales outstanding performance. Operations teams are then tasked to understand each of the key components in order to understand the obstacles to efficiency in the days sales outstanding. Once certain obstacles in the key components are identified, a more detailed order to cash process review takes place. As an example, key staff interviews can take place in order to understand the root causes of issues impacting performance and leading to inefficiencies. Once the key components and their inefficiencies have been identified, new data analysis can be performed to quantify the current impact of the key components on the days sales outstanding performance. Once quantified, each possible solution to the inefficient key component is analyzed and each potential opportunity for improvement is assessed.

In accordance with another aspect, a method is provided for improving the days sales outstanding performance of an organization. The method comprises the steps of analyzing an accounts receivable base, which includes determining the segments that make up the accounts receivable and the associated operational issues that are impacting each segment. Once the operational issues are identified and categorized, root causes for each of the categories leading to the collections inefficiency are determined and assessed. An improvement potential for each root cause is then identified and quantified.

In accordance with still another aspect, a tool is provided for calculating the improvement potential of days sales outstanding. The tool is preferably part of a software program. The tool allows for inputs for the current accounts receivable, current and historical sales and also the improvement potential of each segment. The preferred time period is also inputted into the tool. The tool can then be run within a software program and charts and analysis graphs for the projected accounts receivable and days sales outstanding makeup can be automatically generated as will comparisons.

It will be appreciated by those skilled in the art, given the benefit of the following description of certain exemplary embodiments of the systems and methods of analyzing accounts receivable and sales outstanding, that at least certain embodiments of the invention have improved or alternative systems or methods that are suitable to provide improvement in accounts receivable. These and other aspects, features and advantages of the invention or of certain embodiments of the invention will be further understood by those skilled in the art from the following description of exemplary embodiments.

BRIEF DESCRIPTION OF THE DRAWINGS

The present invention is illustrated by way of example and not limited in the accompanying figures in which like reference numerals indicate similar elements and in which:

FIG. 7 shows a chart describing certain short term initiatives that can be utilized in the qualitative example in FIG. 5.

FIG. 8 shows a chart describing certain long term initiatives that can be utilized in the qualitative example in FIG. 5.

DETAILED DESCRIPTION

Figure 1:
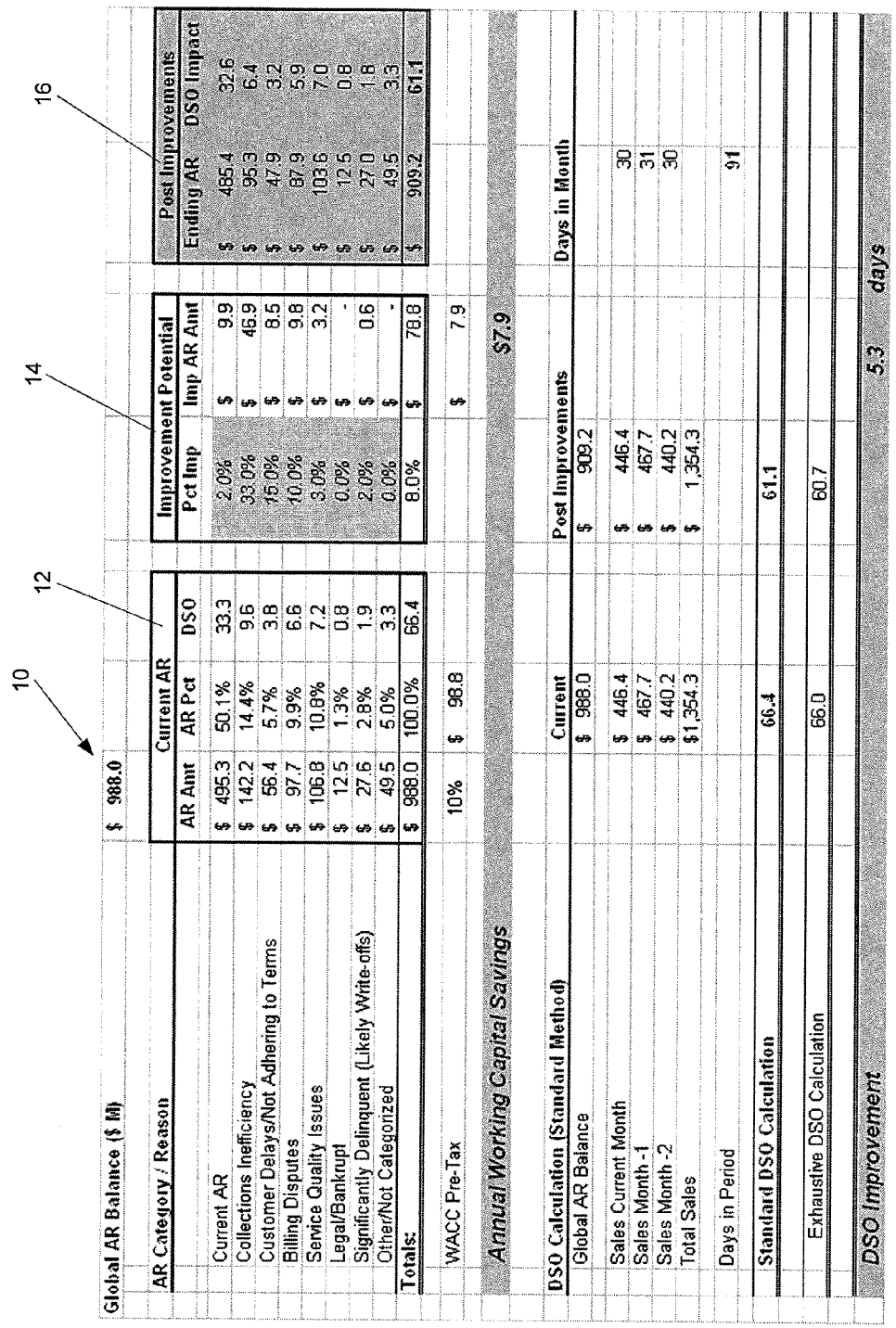
FIG. 1 shows an example of a days sales outstanding tool in accordance with an embodiment of the present invention.

Embodiments of the present invention provides systems and methods for supporting tools to calculate the best possible days sales outstanding and to isolate root causes that create gaps in the achievement of the best possible days sales outstanding. It is contemplated that embodiments in accordance with the present invention can be used for any type of organization with access to organization-specific receivables data and history, and contract terms (e.g., standard payment terms, rates of invoicing errors, billing schedules, etc.).

Embodiments in accordance with the present invention provide consulting and outsourcing opportunities or provide existing service operations with improvement initiatives. It is intended that embodiments of the invention evaluate the basis of existing accounts receivable performance, including days sales outstanding contributors; determine the best possible days sales outstanding, providing a framework and business unit communication vehicle when proposing consulting assessment and improvement opportunities; identify, qualify and quantify potential days sales outstanding gainshare opportunities for outsourcing deals and/or create executive presentations for communicating approach, results and proposed opportunities.

The days sales outstanding is typically the amount of time, preferably measured in days, over a specified time period, for an average day of sales to be turned into cash. A strong order to cash management, and lower days sales outstanding, can lead to increased cash, lower finance costs, improved credit ratings, higher margins and increased shareholder value. The days sales outstanding is also a reflection for the strength of a company's customer relationships, and is regularly used by the investment community as a key indicator of a company's market and financial strength.

The days sales outstanding can be used as more than a standalone measure of collections effectiveness. The measure is representative of much more than just the collection department's ability to collect debt. The days sales outstanding can be utilized to measure the overall order to cash operational results and identify key issues with the end to end process. By using days sales outstanding as a leading indicator, and having strong analytical tools in place to determine root causes, businesses can be more proactive in identifying problems within their order to cash cycle such as: significant extension of payment terms; loose credit policy and lack of adherence to terms; order entry and fulfillment accuracy; product quality and delivery capabilities; service issues, such as network problems or billing inaccuracies; poor customer care and dispute management processes; ineffective collection strategies, workforce and tools; high level of journal entries or bad debt write-offs.

It is contemplated that there are several methods of calculating the days sales outstanding. For consistency and comparison, the following data in Table 1 is used to describe each of the embodiments in accordance with the present invention:

TABLE 1

| Period End Date | Aging Bucket | Accounts Receivable | Sales in Period |
|---|---|---|---|
| Jun. 28, 2006 | Current | $3,000 | $5,000 |
| May 28, 2006 | 1-30 days past due | $3,000 | $6,000 |
| Apr. 28, 2006 | 31-60 days past due | $2,000 | $5,000 |
| | Totals | $8,000 | $16,000 |

In addition, it is contemplated that for sales periods, the term annual refers to 365 days, six months refers to 182 days, a quarter refers to 91 days and a month refers to the actual number of days in the particular month.

In one embodiment, a standard days sales outstanding calculation can be achieved. The standard embodiment provides an average, or aggregate, time in days it takes to convert accounts receivable into cash. In accordance with this embodiment, the formula creates a calculation of the value of an average day of sale and divides the resulting value into the total accounts receivable balance. As such, the ending total receivables can be divided by the total credit sales and multiplied by the number of days in the period. For example, if the total net accounts receivable for widgets is $8,000 and the quarterly sales is $16,000 (and knowing that there are 91 days in a quarter), the standard days sales outstanding would be ($8,000/$16,000)×91=45.5 days. See the data used in Table 1.

Another embodiment of the present invention is known as the sales weighted days sales outstanding calculation. As with the standard, the sales weighted days sales outstanding calculation measures the average time receivables that are outstanding. The sales weighted embodiment also smoothes the bias of sales and terms of sale. As such, the sales weighted days sales outstanding can be calculated by {($ in Current Age widget/Sales of Current Period)+($ in 1-30 Day Age widget/Sales Month−1)+($ in 31-60 Day Age widget/Sales Month−2)+(etc.)}×30 (representative days in each aging period as each are single monthly periods). Utilizing the above data, the sales weighted days sales outstanding can be determined to be 45 days.

In still another embodiment in accordance with the present invention, the days sales outstanding can be calculated utilizing a countback or exhaustive method of calculation. The countback method takes into account monthly fluctuations in sales and past due receivables, giving more weight to current month sales. The assumption is that more of an accounts receivable balance is from current, as opposed to previous sales. Monthly sales figures, starting with the current month, can then be applied against the total receivables balance, thereby "exhausting" the sales.

The countback method includes a number of steps. Step 1 requires an identification of days in the current month (unless ending accounts receivable balance is less than current month sales, which then this step would be skipped because the days sales outstanding will be less than days in current month). Step 2 requires a calculation of the days sales outstanding for periods prior to step 1. This can be achieved by taking the current month end net accounts receivable balance and subtracting the current month sales to obtain the prior period receivables. Further, the {Prior Period Days=(Prior Period Receivables/Prior Period Sales)×# Days in 'Month−1'}. If, however, the prior period receivables are larger than prior period sales, step 2 is repeated, counting all of 'Month−1''s days in the days sales outstanding. Step 2 is to be repeated, stopping when sales exceed prior period receivables. In the third step, the total days sales outstanding is calculated by adding the days of the current month to the days calculated for prior periods in Steps 2.

In the example being used throughout, Step 1 is 30 days (number of days in current month, June). Step 2 calculates Prior Period Days by taking: $8,000 (Total AR)−$5,000 (Current Month Sales)=$3,000; $3,000 (Prior Period AR)/$6,000 (Prior Period Sales)=0.5 and 0.5×31 days (Days in May)=15.5 Days. The total days sales outstanding is calculated in Step 3: 30+15.5=45.5 days.

Certain fundamental factors must also be considered when calculating the days sales outstanding. These factors may impact the calculation. These factors include whether the age of the receivables is a component of the calculation; whether deferred or offline sales are included; whether taxes are included in either of the accounts receivable or sales; whether there are any exceptions made for doubtful accounts or bad debt expenses and whether there are any other exceptions for extended term deals, disputes, etc. considered.

The best possible days sales outstanding calculates the best length of time achievable in turning over receivables if all customers paid to terms. Basically, it portrays what the days sales outstanding would be if all of the over-due amounts were collected and shows the impact those terms have on the days sales outstanding. An example utilizes the following data:

TABLE 2

| Terms | Total AR | % of AR |
|---|---|---|
| Cash | $20,000 | 20% |
| 15 days | $50,000 | 50% |
| 30 days | $10,000 | 10% |
| 60 days | $20,000 | 20% |
| Total Sales | $100,000 | |

The best possible days sales outstanding can be calculated by taking the sum of the terms multiplied by the percentage of sales, so {Best Possible DSO (BPDSO)=Sum of (Terms×% of Sales)}. Using the data, (0×0.20)+(15×0.50)+(30×0.10)+(60×0.20), which would equal 22.5 days. The best possible days sales outstanding is typically dependent on customer credit terms. The delinquent days sales outstanding is the gap between the actual days sales outstanding and the best possible days sales outstanding. This gap is where the largest impact can be made via operational improvements and transformation efforts.

Each organization includes sales information and accounts receivable. Accounts receivable are amounts that are owed to the organization for the sale of a good or service.

In an embodiment of the invention, several steps are taken to recognize the accounts receivable and to maximize the efficiency of the days sales outstanding. While days sales is described herein, it is contemplated that weekly, bi-weekly, monthly, quarterly or yearly sales may be analyzed, depending on the type of business and volume of days sales. It is also contemplated that the accounts receivable may be analyzed in more than one time increment, i.e., daily and yearly, depending on the type of information sought.

In another embodiment of the invention, an analysis of the accounts receivable is performed. Each component of the accounts receivable is reviewed individually and all factors related to that particular component are accounted for. A data tool can then be implemented to analyze the data and to recognize the areas of all of the components that are susceptible to improvement. A strategy can then be developed to maximize the efficiency of the accounts receivable.

In one phase of the present systems and methods, the base of the accounts receivable is analyzed. The key components of the accounts receivable are identified. Each component may include a quantifiable performance evaluation or a qualitative performance evaluation. For example, within the accounts receivable, factors can include collections inefficiency, service or product quality issues and billing errors. Other components contributing to days sales outstanding performance can include customer payment delays, customers not adhering to terms, lenient internal requirements for customers to comply with terms, legal/bankruptcy issues and significantly delinquent (including write-offs) accounts receivable that has not been properly addressed.

Once the key components have been identified, a cash process review is conducted. The cash process review may include key staff interviews to aid in understanding the root causes of issues impacting performance. An order to cash analysis of the process determines the major components leading to a reduction in actual cash once an order has been placed. For example, efficient and effective dispute management and collections capabilities are two factors that contribute to a reduction in days sales outstanding. Contributing to the inefficiency of components are staff expertise and technology.

The accounts receivable portfolio may be segmented. In this way, each individual contributor to the accounts receivable can be analyzed. For example, one inefficiency into the accounts receivable is that collectors may have only minimal training on the existing process or industry segments being supported. There is therefore heavy reliance on the collector having specific customer knowledge. In addition, other factors related to inefficiency of collections include limited collections automation and a poor ability to track status issues. Still other factors in collections inefficiency include effort spent on non-collection activities, unreasonable cash forecasts, collector alignment and specialization, minimal segmentation, ineffective collection strategies and collector adherence and performance management/metrics/reporting.

It is then contemplated that a solution can be implemented to improve collection inefficiency. For example, where there is a basic segmentation of the accounts receivable portfolio, one potential improvement project could be an account characteristic review and key component segmentation, for example, major/minor, high/low credit risk, caller/dispute resolver, slow pay, workout and recovery. Examples of potential improvement projects for collectors with minimal training on the existing processes could be an account/portfolio and collector skill review; an organization model review and update; new collections refresher training manuals and training; and technical solutions to retain knowledge within the company and away from individual collectors. An improvement over the limited collections automation inefficiency could be to begin to deploy an automated collections tool. An improvement over a poor ability to track status and issues might be to implement a software program as a tracking tool. Other software programs could also be used as would be appreciated by those skilled in the art. Other examples of improving tracking efficiency include working with customer care and sales teams on formalizing dispute management process and turnaround time expectations and also deploying automated tools.

Using existing metrics, the current impact on the driving components can be quantified. An order to cash diagnostic tool can be implemented in order to collect the information regarding the collections inefficiencies. The order to cash diagnostic tool has the ability to address the root cause issues and generate improvements to the days sales outstanding by recommending and undertaking proposed initiatives.

As illustrated in the data set forth in FIG. 1, a number of account receivable categories/reasons can be taken into account in order to total a global accounts receivable balance 10. The current accounts receivable 12 may include at least one category of calculation, and can include multiple categories of information, such as accounts receivable amount, accounts receivable percentage and the individual days sales outstanding contribution of each category/reason. A second column of FIG. 1 includes the improvement potential 14 of the accounts receivable, including the expected percentage improvement for each category and the subsequent accounts receivable improvement amount. The percentage improvement category can be a manually generated quantity, based on information gathered regarding the accounts receivable process. The improvement accounts receivable amount may be auto generated and based on the accounts receivable amount and the percentage improvement. A third column shows the post improvements 16, including the ending accounts receivable and the days sales outstanding impact.

Figure 2:
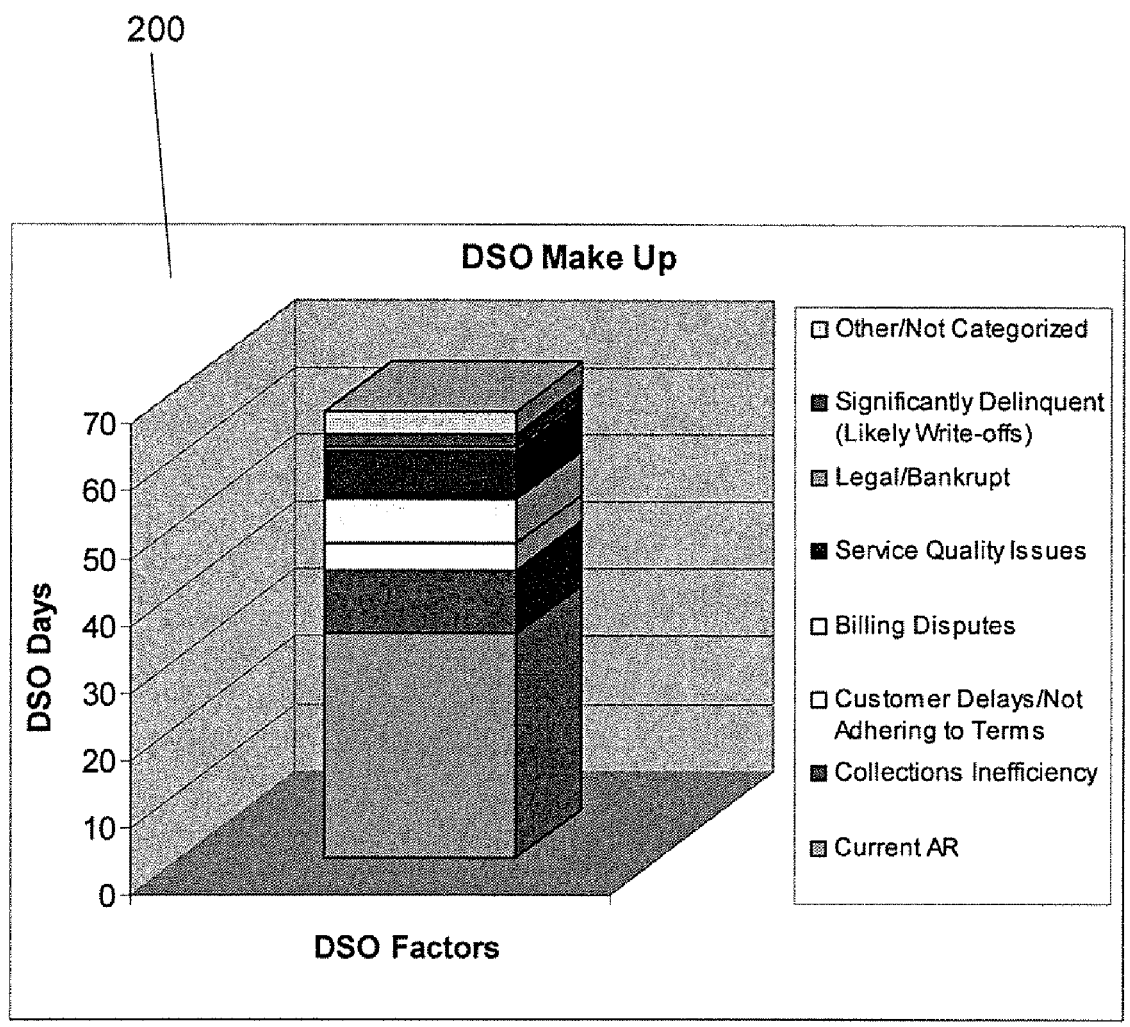
FIG. 2 shows a graph of the days sales outstanding versus factors in accordance with an embodiment of the present invention.

Utilizing all of the information from FIG. 1, the annual working capital savings is calculated by the tool as well as a resulting days sales outstanding figure based on the identified improvement potential. The days sales outstanding calculation uses an exhaustive calculation to represent the days sales improvement opportunity. FIG. 2 shows a graphical representation 200 of the contents of FIG. 1 illustrating the largest areas of current days sales outstanding makeup and the potential improvement opportunities.

Figure 3:
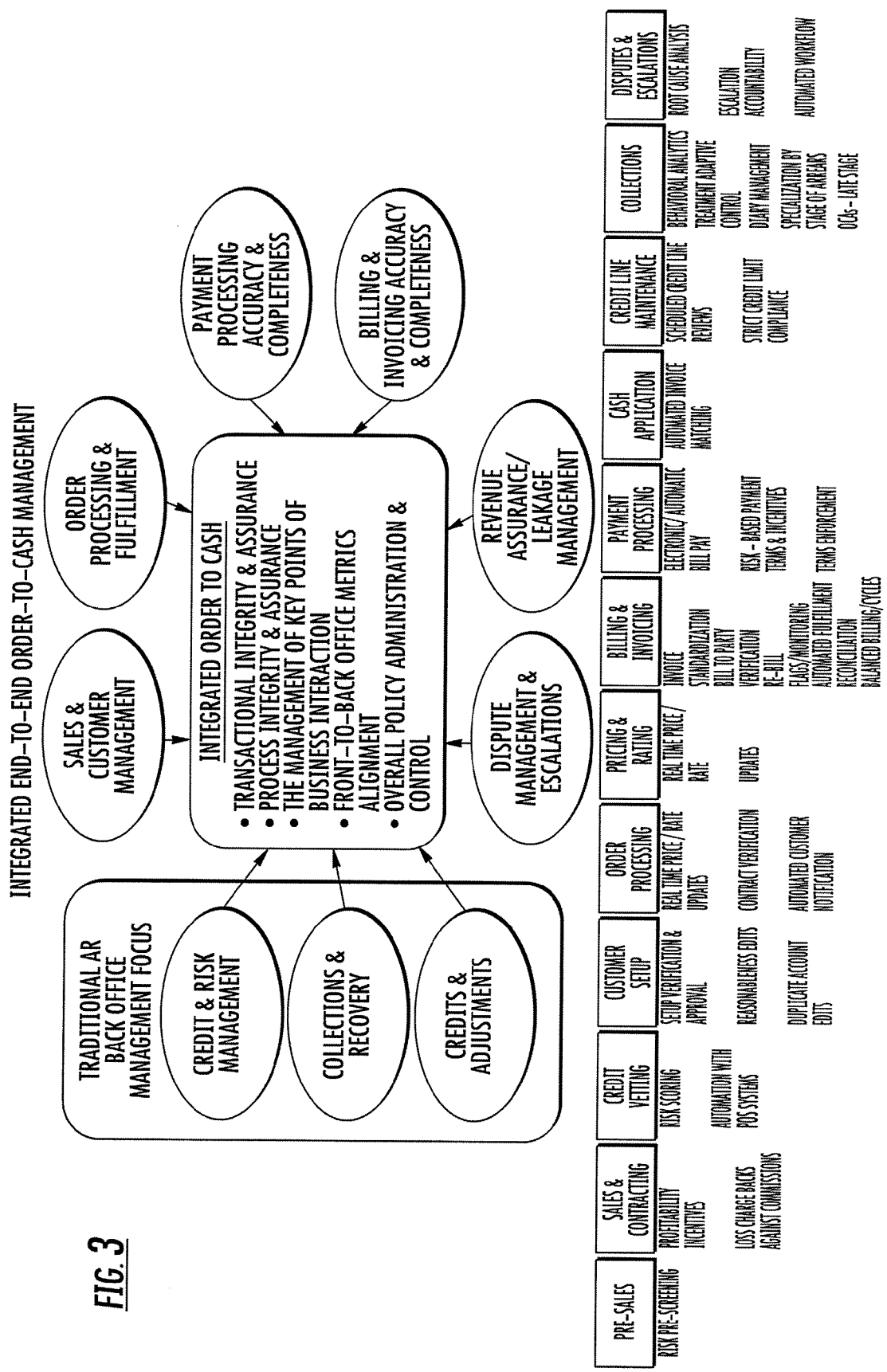
FIG. 3 shows a diagram showing factors related to an integrated end-to-end order-to-cash management process in accordance with an embodiment of the present invention.

An end to end view of the order to cash process assists in determining the drivers of the days sales outstanding. A revenue assurance order to cash diagnostic tool provides key strategic questions that assist in the investigation of a business unit order to cash issues. This is illustrated in FIG. 3. A review of the entire process may occur when investigating the days sales outstanding. There are common elements between any business, but each situation may be unique and driven by an industry affiliation, characteristics of the customer base and/or business context.

Some factors that drive the days sales outstanding include, but are not limited to: undefined or inconsistent credit policy leading to extended credit terms and limited points of leverage to promote customer adherence to terms; ineffective credit risk analysis and management; complex, customized or ambiguous customer contracts; poor data capture and order management processes; slow and error prone product delivery, provisioning or fulfillment; inaccurate and delayed invoicing; high levels of disputes and poor customer care/resolution processes; unclear or inconsistent roles between sales, customer care and collections; limited metrics and lack of target setting for credit and collections department; inadequate collections strategies and segmentation; lack of adherence to collection priorities and processes; misaligned business priorities between sales and finance and limited technology solutions. It is contemplated that many factors may be different from industry to industry.

Many business are able to articulate the high level drivers of their current days sales outstanding performance. It is thus important to recognize these key components to the days sales outstanding. For example, many businesses will have operational processes or reports, or at a minimum one off studies, in place that will categorize the accounts receivable at a high level and provide the basis for understanding the major components. If not, a detailed accounts receivable base analysis and order to cash staff interviews may be required. It is preferable in any improvement agenda to implement a repeatable mechanism to capture, categorize and quantify performance.

Figure 4A:
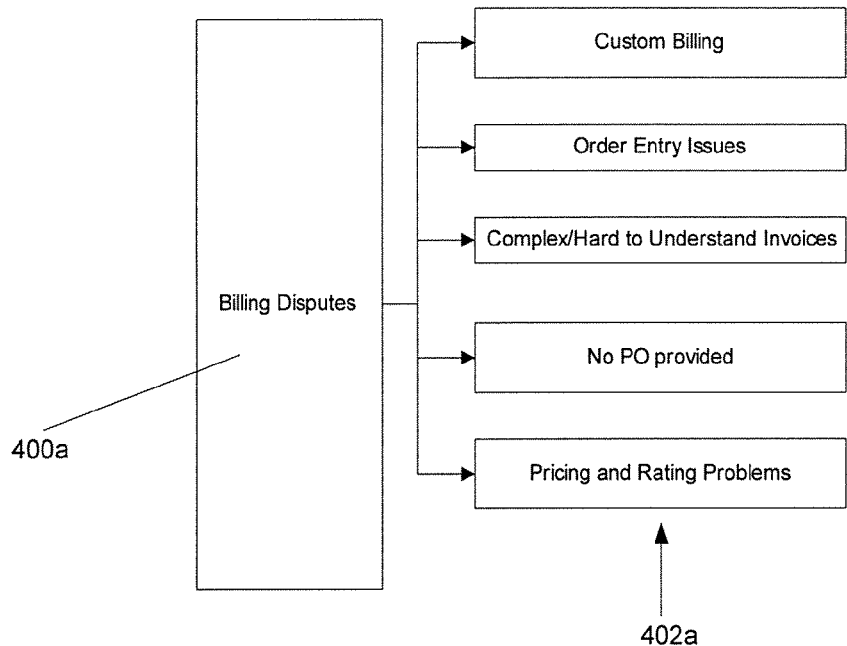
FIG. 4a diagrams a billing disputes category associated with accounts receivable as well as certain root causes in accordance with an embodiment of the present invention.
Figure 4B:
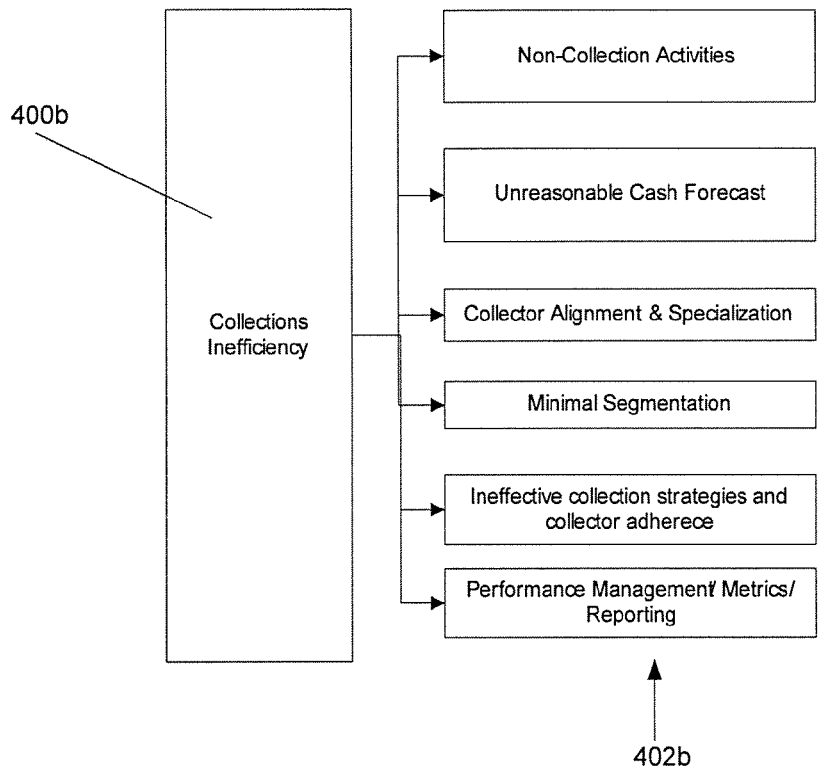
FIG. 4b diagrams a collections inefficiency category associated with accounts receivable as well as certain root causes in accordance with an embodiment of the present invention.

After understanding some of the factors influencing the days sales outstanding performance, the root causes of these issues can be determined. In some cases, a collector is able to understand why a customer is not making a payment, but does not have enough information or expertise to determine the actual cause of the issue. Through an understanding of the order to cash process, the root causes affecting days sales outstanding can be determined. FIGS. 4a and 4b show two broader issues and exemplify certain root causes for those issues. FIG. 4a diagrams a billing disputes category 400a associated with accounts receivable as well as certain root causes 402a in accordance with an embodiment of the present invention. FIG. 4b diagrams a collections inefficiency category 400b associated with accounts receivable as well as certain root causes 402b in accordance with an embodiment of the present invention.

Once the root causes for each of the underlying issues affecting the days sales outstanding has been determined, the ability to influence change in each area is analyzed to define projects that can generate improvements. For example, if a root cause is an order entry issue, an improvement idea can include additional validation of data fields in the sales ordering system and customer self service or new sales training manuals and training. Another example of a root problem is complex or hard to understand invoices. An improvement idea can include an invoice format review and rationalization or a collections guide to better handle customer invoice inquires. Another example is if the root cause is a collector alignment or specialization, then an improvement idea could include account/portfolio and collector skill review or an organization model review and update. As another example, if the root cause is minimal account segmentation, an improvement idea could include an account characteristic review and key component segmentation, e.g., major/minor, high/low credit risk, caller/dispute resolver, slow pay or workout and recovery. The above root causes are considered to be exemplary and it is to be understood that a number of other root causes may impact days sales outstanding depending on a number of factors, including which industry is being analyzed.

It is also contemplated that embodiments in accordance with the present invention can improve and transform days sales outstanding from high days sales outstanding to lower without necessarily improving each of the categories of accounts receivable. It is contemplated that an anchor goal of working capital improvement can be a starting point. From there, a high-performing order to cash operating model can be implemented through leveraging leading practices and ongoing capabilities. This may include the alignment of priorities between finance and the business, as well as third parties, such as consultants, the ability to isolate and measure performance contribution components and root causes of barriers to performance improvement and the controlled, automated and efficient business processes and leveraging enabling technology.

Figure 5:
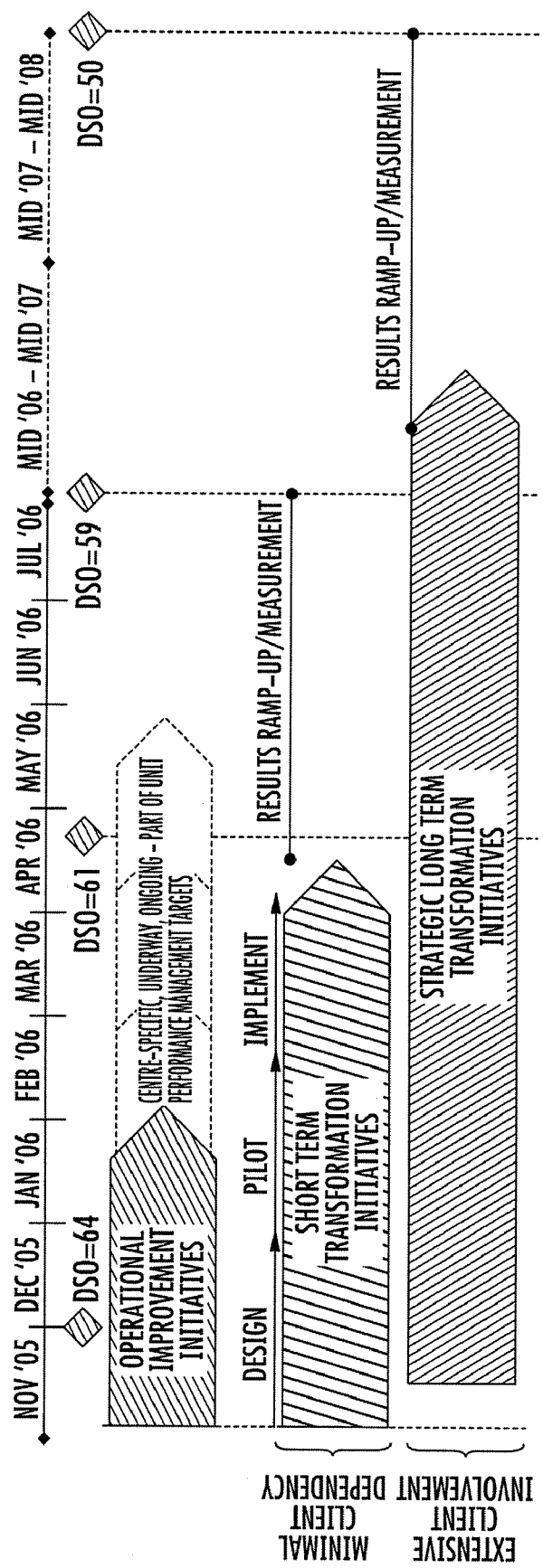
FIG. 5 illustrates a qualitative view of a process of implementing an order to cash transformation program in accordance with an embodiment of the present invention.

The order to cash transformation programs in accordance with the present invention include operational improvement efforts, as well as both tactical short and strategic long term transformation initiatives that will drive material reduction in days sales outstanding in phases. A qualitative example outlining this embodiment is shown at FIG. 5.

Figure 6:
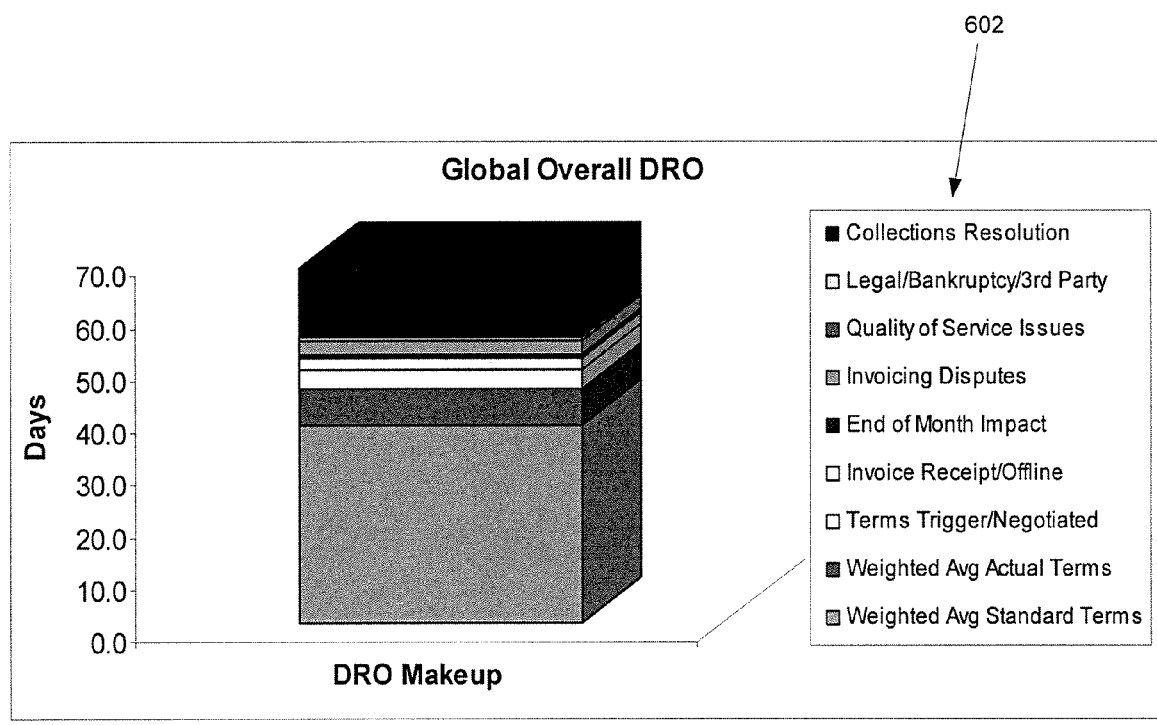
FIG. 6 shows a diagram of each of the contributors to accounts receivable inefficiencies in accordance with an embodiment of the invention.

As an example, FIG. 6 shows global overall days sales outstanding of a business as approximately 70 days, where the best possible days sales outstanding is around 51.5. As can be seen, a number of contributors for the days sales outstanding performance are analyzed: collections resolution, legal/bankruptcy/third party, quality of service issues, invoicing disputes, end of month impact, invoice receipt/offline, terms trigger/negotiated, weighted average of actual terms and the weighted standard terms. As shown in FIG. 6, each of the contributors to accounts receivable inefficiency is categorized and identified in a category legend 602. The weighted average of the country's standard payment term is 37.8 days. Additional term related items, including non-standard terms, negotiated agreements and specific characteristic that add to term impacts (e.g., end of the month) lead to the best possible global days sales outstanding as being 51.5 days. Of the gap between the existing 70 days sales outstanding 51.5 days best possible days sales outstanding, invoicing issues can account for as many as 2.5 days. The days sales outstanding can be improved by addressing problems in the order to cash process and nuances with business practice and business cycles.

It is contemplated that improvements in connection with short term transformation initiatives can take place at individual locations, thus small improvements locally will aggregate to large savings of time globally. For example, one location may have an improvement plan that includes key actions of training, proactive dunning, collector scorecards and reviews, improved escalation, etc. This targeted impact can result in a global days sales outstanding decrease of 1.5 days. At the same time, another center can improve focus. This can be achieved by tracking weekly collector coverage, creating a weekly "due" list to supplement the collector's work prioritization; tracking solution escalations for better visibility/turn-around time on resolutions and proactively providing business unit visibility to high dollar accounts to assist in enforcing customer contractual payment terms. Still another center may also improve on focus, by a better understanding of receivables segmentation and associated escalations; more aggressive use of dunning letters/statements; focus on calling the customer versus use of email; and refresher training completed for collectors (stressing escalation follow-up goals).

It is also contemplated that operational improvement can be achieved by plan/focus improvement of all locations, in order to globally aggregate the improvements. For example, weekly collection leader calls (cash/credits reviewed weekly and a forum for global process deployment); ongoing incentives for collectors (particularly in mid quarter months); cash collection goals that are tied to the days sales outstanding objectives (results typically reported by center) and a focus on the systematic review process, including team leader levels.

It is contemplated that a number of short term initiatives may be implemented, including, but not limited to: metrics scorecard/dashboard; operational impact metrics; activity monitoring and performance measurement; high balance collections, high balance invoice confirmation; global collections prioritization matrix; collector incentive programs; do not call review; write off policy review; escalation protocol adherence; credit policy adherence; small balance clean up; credit balance clean up and third party collection strategies. It is contemplated that other short term initiatives may be implemented based on the type of business unit and the specific factors that affect accounts receivable efficiency. FIG. 7 shows a chart displaying the various short term initiatives for the improvement illustrated in FIG. 5.

Order to cash transformation utilizing short term transformation initiatives can be implemented sequentially, in sets or combination. While each initiative will be coordinated globally, specific initiative efforts will be tailored to and executed at a center/regional level as appropriate. Table 3 below describes various short term initiatives and implementations for the improvements illustrated in FIG. 5.

The first set of short term initiatives in this example will deliver improved facilities to monitor and measure performance and activities both up and downstream, and the resulting impact on days sales outstanding. The will enable collectors to focus on more impactful and productive treatment activities to drive better results. The first set of short term initiatives can include: metrics scorecard/dashboard; operation impact metrics and activity monitoring and performance measurement. Although it is contemplated that other short term initiatives could be used in the first set depending on the implementation.

With close linkage to and coordination with in-process operational level efforts, a second set of short term initiatives involve the design and implementation of new reporting tools, treatment activities and collections programs focused on larger balance invoices and accounts. The second set of short term initiatives can include: high balance collections; high balance invoice confirmation; global collections prioritization matrix and collector incentive programs. Although it is contemplated that other short term initiatives could be used in the second set depending on the implementation.

A next set of short term initiatives may be focused on the adherence to policies that are critical in driving improved days sales outstanding, the recommended changes to policies and/or practices and/or the implementation of compliance tracking/enforcement mechanisms. This third set of short term initiatives can include: a do not call review; write off policy review; escalation protocol adherence and credit policy adherence. Although it is contemplated that other short term initiatives could be used in the third set depending on the implementation.

A final or fourth set of short term initiatives in this example can be focused on tactical efforts or clean-up activities that will improve the overall ledger quality, streamline collections processes and enable collectors to focus on invoices/accounts with a higher likelihood of recovery. This final set of short term initiatives can include: small balance clean up; credit balance clean up and third party collections strategy. It is contemplated that more than four sets of short term initiatives may be necessary depending on the implementation and also that other short term initiatives could be used in the fourth set depending again on the implementation.

TABLE 3

| Initiative | Deliverable | Milestone Date |
| --- | --- | --- |
| Small Balance Clean Up | A program, supplemented with improved reporting facilities, that will enable better root cause identification, treatment assignment, and recovery of smaller balances with less direct, manual collector intervention | Feb. 26, 2006 |
| Credit Balance Clean Up | A program, supplemented with improved reporting facilities, that will enable more expeditious clearing of credit balances, offset against outstanding debits, and/or refunds (if appropriate) | Mar. 24, 2006 |
| 3rd Party Collections Strategy | A program that will trial and expand the use of Std party outside collections agencies, especially for smaller balances and/or more aged balances. | Feb. 15, 2006 |
| High Balance Collections SWAT | A tool that will be used to facilitate ongoing analyses at a regional and BU level | Feb. 24, 2006 |

TABLE 3-continued

| Initiative | Deliverable | Milestone Date |
| --- | --- | --- |
| High-Balance Invoice Confirmation | Expanding the depth of existing confirmation of high dollar invoices for Sarbanes Oxley to include better scripting, reporting and training to better capture status of invoice collection not just receipt | Feb. 10, 2006 |
| Global Collections Prioritization Matrix | Will result in a fundamental reallocation of collector assignments and workload, and the implementation of new treatment scenarios (derived from high-impact activity reporting) | Mar. 17, 2006 |
| Collector Incentive Programs | Based on cross-centre best practices, recommendations for improvement in incentive programs that are more directly aligned with high-priority, high-impact collector activities | Mar. 10, 2006 |
| Do Not Call Review | An assessment/sizing of the impact of do not call informal policies on DSO, and the formulation of go-forward treatment recommendations | Feb. 10, 2006 |
| Write off Policy Review | A tool to capture and track write-off policy adherence, including the analysis of historical recovery percentages a varying stages of arrears, and recommendations for improvement | Feb. 10, 2006 |
| Escalation Protocol Adherence | A tool to capture and track the status of escalations, a review of existing collector compliance against policy (including follow-up), a review of business unit compliance (i.e. accountability, ownership and turnaround), and recommendations for improvement/ more timeline resolution | Mar. 3, 2006 |
| Credit Policy Adherence | Analysis, recommendation and quick win implementation of improved credit management processes to improve collection performance (e.g. use of credit hold), including reporting to better capture and track credit policy adherence and subsequent account performance | Feb. 26, 2006 |
| Metrics Scorecard/Dashboard | A new facility built from cross-centre best practices to measure and report upon DSO composition and identify impact levers from across the OTC cycle | Feb. 17, 2006 |
| Operational Impact Metrics | Integrated with the Metrics Scorecard/ Dashboard, an improved capability to monitor collections operations-level activities, levers and resulting impact on DSO | Mar. 1, 2006 |
| Activity Monitoring & Performance Measurement | Enabled by the Operational Impact Metrics and new Scorecard/Dashboard, this initiative will result in the identification of key operational activities that will drive the greatest DSO impact, and the implementation of specific campaigns/programs to increase these activities and related output | Feb. 14, 2006 |

It is also contemplated that a number of long term initiatives may be implemented. Long term initiatives will involve more significant changes, often involving technology, and include more substantial investment. Possible initiatives include, but are not limited to: credit/payment term rationalization; deployment of a collections software tool; electronic and credit card payment options and order management (order assurance, billing and invoicing fortification). FIG. 8 shows a chart 800 displaying the various long term initiatives for the improvement illustrated in FIG. 5. Table 4 below describes various long term initiatives and implementations for the improvements illustrated in FIG. 5.

A first set of long term initiatives may be implemented. The longer term initiatives are more strategic in nature and involve significant coordination with the business. The first effort, however, is focused on the implementation of a tool that will help to improve collections performance and business collaboration. This will involve extensive coordination with the business's information technology organization. A first set of long term initiatives may include collector workstations. Along with this long term initiative are other factors, including: dynamic customer segmentation; automation of collection strategies; advance reporting and flexible querying; improved activity monitoring and management controls; automated dispute management, workflow routing and tracking capabilities and automated collection contacts. It is contemplated that other long term initiatives could be used in the first set depending on the implementation.

A second set of long term initiatives is focused on the restructuring of policies, methods and mechanisms used to extend, negotiate, approve and monitor the terms. This involves extensive coordination with the business. A second set of long term initiatives may include payment terms. Along with this long term initiative are other factors, including: ensuring accurate contractual payment terms that are defined at contract/order; consistently capturing terms in their order to cash applications; aligning corporate, business unit and third party consultant goals/objectives; reviewing corporate and enforcing adherence to customer payment terms while limiting negotiated terms and investigating including a working capital element in business unit monthly results and incentive plans. It is contemplated that other long term initiatives could be used in the second set depending on the implementation.

A third and final major effort is focused on the identification and implementation of opportunities for improvement in the upstream management process for both services and solutions. This will involve extensive coordination with the business. A third set of long term initiatives may include order management. Along with the long term initiative are other factors, including: understanding and quantifying root causes of 'defective orders' (i.e., complex pricing, invalid PO's); standardizing order capture requirements; systematic validation of invoicing and collection requirements during ordering; no touch order capability across the business; communicate, train (and monitor) sales teams on invoicing and collection order requirements; standardization of preferences, format and content; electronic invoicing (EIPP, EDI) modifying practices to level billing volume; servicing billing timeliness; reducing/canceling rebill activity; reengineering the billing process relate to customers "move, add, change" and to "time and material" invoices.

high priority requests for assistance and support. As such, it is contemplated that reinforcement of the strategic mandate at the business level may be necessary to reduce the days sales outstanding. This can be achieved through supporting monthly (or some other time period) key-account awareness building and watch list calls with business executives; by establishing business goals and targets; by assigning accountability and ownership and also by working with the business to build plans for reducing the days sales outstanding.

In addition, it may be necessary to provide support in partnering with the business to align transformation activities with those plans formulated at the business or regional level. Also, it is contemplated to work with information technology departments in prioritizing key support activities and enabling a fast track decision regarding collections workstations. Also helpful to develop and support the action plans are redesigning policies and exception procedures related to the extension of non-standard terms; redesigning validation of credit hold and release processes and business unit compliance and support of operational enforcement policies and a reduction in cancel-credit-rebill and dispute resolution cycle times.

Once all of the factors into the accounts receivable have been identified and root causes determined, the improvement potential for each of the factors can be assessed. As part of understanding existing performance, clarifying key drivers and factors and developing areas for improvement, a key element is assessing the potential likelihood and magnitude of improvement in each area. Using the best information possible, estimates for the improvement opportunity possible in each key accounts receivable category can be attained. In

TABLE 4

| Initiative | Deliverable | Milestone Date |
|---|---|---|
| Collector Workstation | The evaluation selection and implementation of a new tool that will enable automation of collector activities, improved workflow between collection and business unites (especially in the context of escalations and disputes), diary management, reporting, and tracking. | May 31, 2006 |
| Payment Terms | Systematic and accurate capture of payment terms | May 31, 2006 |
| | Recommendation, design and (with approval) implementation of realigned and/or standardized payment terms, policies, reporting, and compliance mechanisms. | Dec. 1, 2006 |
| Order Management | The recommendation, design and (with approval) implementation of changes (process and/or technical) in the order management process, including order processing, billing and invoicing. | Jul. 31, 2006 Dec. 31, 2006 |
| Collective Workstation | The evaluation selection and implementation of a new tool that will enable automation of collector activities, improved workflow between collection and business unites (especially in the context of escalations and disputes), diary management, reporting, and tracking. | Jun. 30, 2006 |

It is contemplated that other long term initiatives could be used and that more than three sets of long term initiatives may be necessary depending on the implementation and also that other long term initiatives could be used in the described sets of initiatives depending again on the implementation.

In implementing systems and methods in accordance with the present invention, it is contemplated that there may be assessing improvement potential, there are many factors to consider, including, but not limited to: the complexity (systems versus people versus process); ownership (business unit versus third party ability to influence); criticalness of item to the businesses core business and process (e.g., payment terms needed to win business and long standing invoicing practices).

After determining the improvement opportunity and projects that can influence change, it is then possible to quantify in working capital and days sales outstanding terms the potential benefits. In the example of FIG. 1, there is a $7.9 million working capital benefit and 5.3 days reduction in days sales outstanding. One advantage shown in this example is having cash for extra days. This allows the business to have additional cash on hand for operational and investment purposes and save what would be the necessary cost of capital to raise the funds from an external source.

It is contemplated that the above methods and systems can be utilized in a software program and provided as a tool to assess the days sales outstanding. The tool can help with data capture, quantification of the impacts and presentation of benefits for days sales outstanding improvement opportunities. The software program can be used with commonly used programs, such as Microsoft Excel and PowerPoint. The tool takes as inputs accounts receivable, sales and improvement potential data and can automatically generate working capital and days sales outstanding benefit figures and graphs. It is contemplated that certain embodiments of the present invention can take other pieces of information as inputs as would be required depending on the industry and nature of the business. The data received from the tool can be used to provide an executive summary.

In using days sales outstanding tools in accordance with embodiments of the present invention, inputs are first made. The inputs are based on a determination of the appropriate categories of accounts receivable performance factors that will be addressed. Then the amount of accounts receivable associated with each category is quantified. Sales data for a given time period of interest for the corresponding business being assessed are then obtained and also entered. The cost of capital is also assessed, typically by communications with the business and often relying on figures conveyed by the business. An identification is also made of the time period (typically days) in the accounting period desired to be used for the days sales outstanding calculation.

Once the above inputs have been assessed, the tool can then be completed using the categories and accounts receivable figures input a first portion of the tool. The recent sales data collected can also then be inputted into a second portion of the tool. The cost of capital can then be inputted into a third portion of the tool. The time period of the accounting period can then be inputted into a fourth portion of the tool. Following an analysis of the order to cash process, the potential for improvement of each of the accounts receivable category can then be assessed. The percentage improvement figures can then be inputted into a fifth portion of the tool.

Once the inputs have been made in the appropriate portions of the tool, the tool can then be run in order to compile the accounts receivable and days sales outstanding impacts for accounts receivable category, which will be generated in a sixth portion of the tool. The overall working capital savings and days sales outstanding improvement expected with the accounts receivable category improvements is then automatically calculated. It is also contemplated that the individual accounts receivable categories improvement percentage can be modified manually (or be adjusted automatically based on predetermined preferences) based on the overall assessment. If any improvement percentage is modified, all of the results may then be automatically modified.

Figure 9:
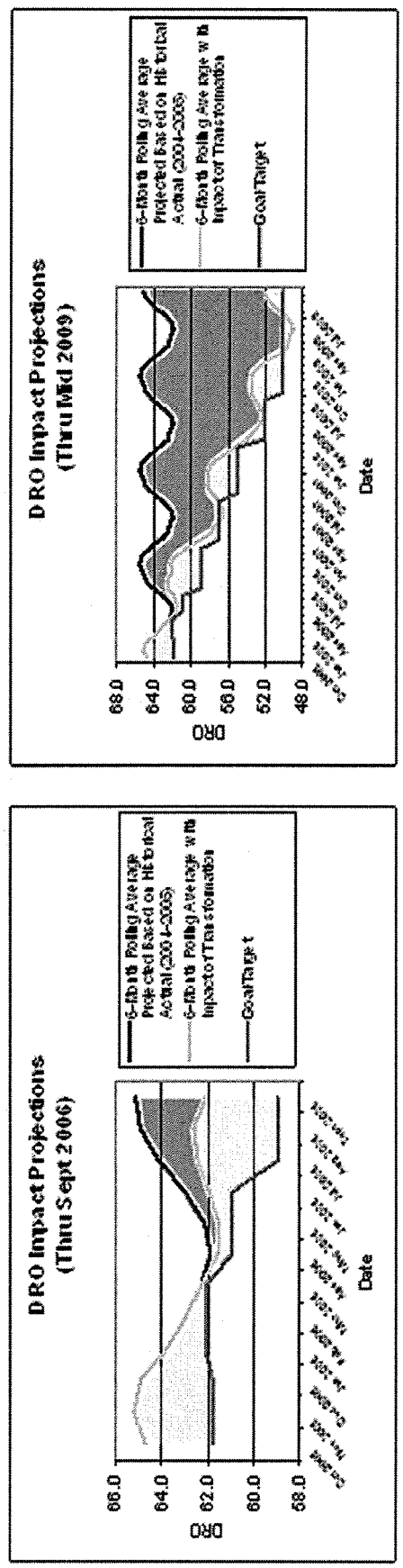
FIG. 9 shows performance graphs of the days sales outstanding impact projections in accordance with an embodiment of the present invention.

It is contemplated that the results of running the tool will provide charts and analysis graphs for the user. The charts and analysis graphs for the accounts receivable and days sales outstanding makeup will be automatically generated as will any comparisons, such as the "as-is" and "to-be" performance. It is further contemplated that the performance graphs can be adjusted as desired with respect to format, legends, titles, etc. An example of an embodiment of the tool is shown at FIG. 1. An example of an embodiment of the resultant charts and analysis graphs is shown at FIGS. 2 and 9.

In implementing systems and methods in accordance with the present invention, underlying factors are important to the success of the implementation, including: requirements on changes to behavior of the corporation; days sales outstanding improvement while pursuing cost reductions and reliance on end customer actions in meeting days sales outstanding improvements.

Sharing of the resulting benefits between the company executing the days sales outstanding improvements and the business are often contemplated. Such arrangements allow the provider to share in the businesses gain and they remove some risk from the business as service provider fees will be dependent on delivery of actual business results. Key items to consider for gain share proposals should also be considered, including, but not limited to: the state of business (is cash flow paramount or secondary to revenue, margins, sales); is the days sales outstanding a real business priority; is days sales outstanding the right measure (days sales outstanding is a cash measure); the contractual language associated with the agreement including: exception language and process; base line periods and methods for setting targets; scaling of rewards; timing of actual measures and payments.

Figure 10:
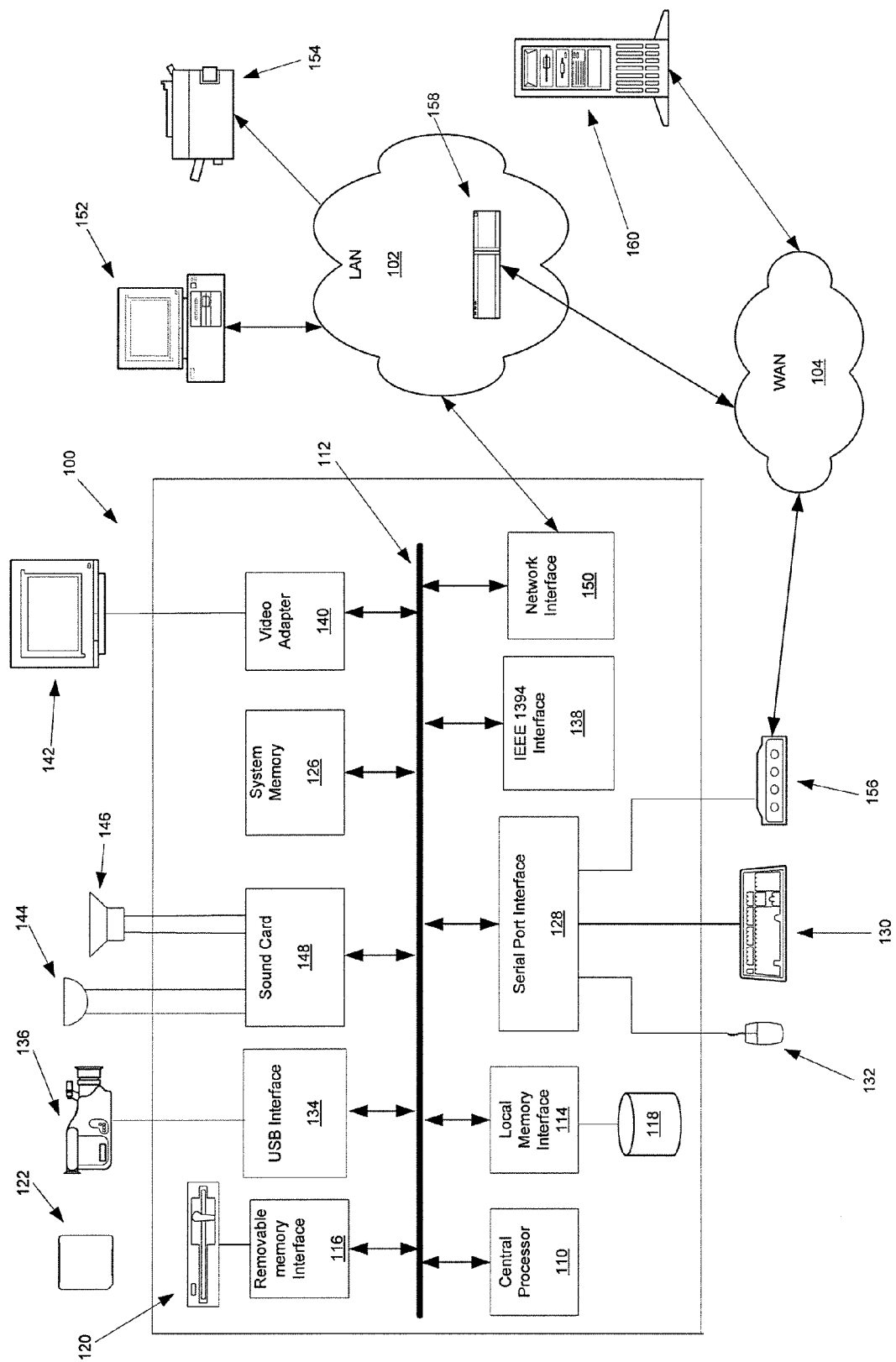
FIG. 10 shows a hardware system that can be utilized with embodiments of the present invention.

Embodiments of the present invention may be embodied on a computer system, such as the system 100 shown in FIG. 10. Computer 100 includes a central processor 110, a system memory 112 and a system bus 114 that couples various system components including the system memory 112 to the central processor unit 110. System bus 114 may be any of several types of bus structures including a memory bus or memory controller, a peripheral bus, and a local bus using any of a variety of bus architectures. The structure of system memory 112 is well known to those skilled in the art and may include a basic input/output system (BIOS) stored in a read only memory (ROM) and one or more program modules such as operating systems, application programs and program data stored in random access memory (RAM).

Computer 100 may also include a variety of interface units and drives for reading and writing data. In particular, computer 100 includes a hard disk interface 116 and a removable memory interface 120 respectively coupling a hard disk drive 118 and a removable memory drive 122 to system bus 114. Examples of removable memory drives include magnetic disk drives and optical disk drives. The drives and their associated computer-readable media, such as a floppy disk 124 provide nonvolatile storage of computer readable instructions, data structures, program modules and other data for computer 100. A single hard disk drive 118 and a single removable memory drive 122 are shown for illustration purposes only and with the understanding that computer 100 may include several of such drives. Furthermore, computer 100 may include drives for interfacing with other types of computer readable media.

A user can interact with computer 100 with a variety of input devices. FIG. 10 shows a serial port interface 126 coupling a keyboard 128 and a pointing device 130 to system bus 114. Pointing device 128 may be implemented with a mouse, track ball, pen device, or similar device. Of course one or more other input devices (not shown) such as a joystick, game pad, satellite dish, scanner, touch sensitive screen or the like may be connected to computer 100.

Computer 100 may include additional interfaces for connecting devices to system bus 114. FIG. 10 shows a universal serial bus (USB) interface 132 coupling a video or digital camera 134 to system bus 114. An IEEE 1394 interface 136 may be used to couple additional devices to computer 100. Furthermore, interface 136 may configured to operate with particular manufacture interfaces such as FireWire developed by Apple Computer and i.Link developed by Sony. Input devices may also be coupled to system bus 114 through a parallel port, a game port, a PCI board or any other interface used to couple and input device to a computer.

Computer 100 also includes a video adapter 140 coupling a display device 142 to system bus 114. Display device 142 may include a cathode ray tube (CRT), liquid crystal display (LCD), field emission display (FED), plasma display or any other device that produces an image that is viewable by the user. Additional output devices, such as a printing device (not shown), may be connected to computer 100.

Sound can be recorded and reproduced with a microphone 144 and a speaker 166. A sound card 148 may be used to couple microphone 144 and speaker 146 to system bus 114. One skilled in the art will appreciate that the device connections shown in FIG. 1 are for illustration purposes only and that several of the peripheral devices could be coupled to system bus 114 via alternative interfaces. For example, video camera 134 could be connected to IEEE 1394 interface 136 and pointing device 130 could be connected to USB interface 132.

Computer 100 can operate in a networked environment using logical connections to one or more remote computers or other devices, such as a server, a router, a network personal computer, a peer device or other common network node, a wireless telephone or wireless personal digital assistant. Computer 100 includes a network interface 150 that couples system bus 114 to a local area network (LAN) 152. Networking environments are commonplace in offices, enterprise-wide computer networks and home computer systems.

A wide area network (WAN) 154, such as the Internet, can also be accessed by computer 100. FIG. 10 shows a modem unit 156 connected to serial port interface 126 and to WAN 154. Modem unit 156 may be located within or external to computer 100 and may be any type of conventional modem such as a cable modem or a satellite modem. LAN 152 may also be used to connect to WAN 154. FIG. 1 shows a router 158 that may connect LAN 152 to WAN 154 in a conventional manner.

It will be appreciated that the network connections shown are exemplary and other ways of establishing a communications link between the computers can be used. The existence of any of various well-known protocols, such as TCP/IP, Frame Relay, Ethernet, FTP, HTTP and the like, is presumed, and computer 100 can be operated in a client-server configuration to permit a user to retrieve web pages from a web-based server. Furthermore, any of various conventional web browsers can be used to display and manipulate data on web pages.

The operation of computer 100 can be controlled by a variety of different program modules. Examples of program modules are routines, programs, objects, components, data structures, etc., that perform particular tasks or implement particular abstract data types. The present invention may also be practiced with other computer system configurations, including hand-held devices, multiprocessor systems, microprocessor-based or programmable consumer electronics, network PCS, minicomputers, mainframe computers, personal digital assistants and the like. Furthermore, the invention may also be practiced in distributed computing environments where tasks are performed by remote processing devices that are linked through a communications network. In a distributed computing environment, program modules may be located in both local and remote memory storage devices.

The invention is flexible in terms of the time periods considered for measure. For example, it is contemplated that the tool may be used on a daily, monthly, quarterly, semi-annually, annually basis and other such basis as would be appreciated by those of ordinary skill in the art and in accordance with whichever business unit is implementing the tool. In addition, it is contemplated that a day may be too long of a time period, as in the case of Internet sales, which may consider outstanding sales on a secondly, minutely, or hourly basis. All such time periods are contemplated within the scope of the invention.

The foregoing embodiments are to be considered in all respects illustrative rather than limiting the invention described herein. The invention has been described with reference to certain preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Given the benefit of the above disclosure and description of exemplary embodiments, it will be apparent to those skilled in the art that numerous alternative and different embodiments are possible in keeping with the general principles of the invention disclosed here. Those skilled in this art will recognize that all such various modifications and alternative embodiments are within the true scope and spirit of the invention. The appended claims are intended to cover all such modifications and alternative embodiments. It should be understood that the use of a singular indefinite or definite article (e.g., "a," "an," "the," etc.) in this disclosure and in the following claims follows the traditional approach in patents of meaning "at least one" unless in a particular instance it is clear from context that the term is intended in that particular instance to mean specifically one and only one. Likewise, the term "comprising" is open ended, not excluding additional items, features, components, etc.

What is claimed is:

1. A method for providing an assessment results report for an accounts receivable of a business, the method comprising:
    obtaining a first information set indicative of categories of data of the accounts receivable of the business to obtain a days sales outstanding figure;
    obtaining a second information set indicative of operational issues impacting the categories of data for the categories of data of the accounts receivable;
    determining, from the second information set, a plurality of root causes corresponding to the operational issues impacting the categories of data;
    determining an improvement potential for the plurality of root causes by assessing a potential likelihood and magnitude of improvement of the plurality of root causes;
    automatically calculating, in a computing device, an improved days sales outstanding from the days sales outstanding figure and the improvement potential for the plurality of root causes; and
    automatically generating an assessment results report for the improved days sales outstanding from the first and second information sets wherein the assessment results report is automatically generated by the computing device.

2. The method of claim 1 where the days sales outstanding figure is calculated utilizing a standard days sales outstanding calculation.

3. The method of claim 1 where the days sales outstanding figure is calculated utilizing a sales weighted days sales outstanding calculation.

4. The method of claim 1 where the days sales outstanding figure is calculated utilizing a countback days sales outstanding calculation.

5. The method of claim 1 where the days sales outstanding figure is calculated utilizing a best possible days sales outstanding.

6. The method of claim 1 where the assessment result report includes an improved days sales outstanding assessment.

7. The method of claim 1 where the assessment results report yields a number of day improvement to overall days sales outstanding.

8. The method of claim 1 where the second set of information indicative of a desired number of days of improvement of overall days sales outstanding.

9. The method of claim 8 where the assessment results report yields an improvement potential for each category of data of the accounts receivable.

10. The method of claim 9 where a modification of the improvement potential for a category of data will result in an adjustment of all other categories of data.

11. The method of claim 10 where two or more improvement potentials for a category of data can be modified which will result in an adjustment of all other categories of data.

12. A method for providing an assessment results report for an accounts receivable of a business, the method comprising:
  obtaining a first information set indicative of categories of data of the accounts receivable of a business unit to obtain a days sales outstanding figure;
  obtaining a second information set indicative of operational issues impacting the categories of data and a desired number of days of improvement for each category of data of the accounts receivable;
  determining, from the second information set, a plurality of root causes corresponding to the operational issues impacting the categories of data;
  determining an improvement potential for the plurality of root causes by assessing a potential likelihood and magnitude of improvement of the plurality of root causes;
  automatically calculating, in a computing device, an improved days sales outstanding from the days sales outstanding figure and the improvement potential for the plurality of root causes; and
  automatically generating an assessment results report for the improved days sales outstanding from the first and second information sets wherein the assessment results report is automatically generated by the computing device.

13. The method of claim 12 where the assessment results report indicates an improvement potential for each category of data of the accounts receivable of the business unit.

14. The method of claim 13 where the improvement potential for a category of data can be modified.

15. The method of claim 14 where a modification of the improvement potential for a category of data will result in an adjustment of all other categories of data.

16. The method of claim 15 where a second modification of the improvement potential for a category of data will result in no change to the first modification and readjustment of all other categories of data.

17. A non-transitory computer readable medium containing program instructions embodied therein for causing a computer system to provide an assessment results report for an accounts receivable of a business, the program instructions comprising:
  instructions to obtain a first information set indicative of categories of data of the accounts receivable of the business to obtain a days sales outstanding figure;
  instructions to obtain a second information set indicative of operational issues impacting the categories of data for the categories of data of the accounts receivable;
  instructions to determine from the second information set, a plurality of root causes corresponding to the operational issues impacting the categories of data;
  instructions to determine an improvement potential for the plurality of root causes by assessing a potential likelihood and magnitude of improvement of the plurality of root causes;
  instructions to automatically calculate, in a computing device, an improved days sales outstanding from the days sales outstanding figure and the improvement potential for the plurality of root causes; and
  instructions to automatically generate an assessment results report for the improved days sales outstanding from the first and second information sets wherein the assessment results report is automatically generated by the computing device.

18. The non-transitory computer readable medium of claim 17 wherein the days sales outstanding figure is calculated utilizing a standard days sales outstanding calculation.

19. The non-transitory computer readable medium of claim 17 wherein the days sales outstanding figure is calculated utilizing a sales weighted days sales outstanding calculation.

20. The non-transitory computer readable medium of claim 17 wherein the days sales outstanding figure is calculated utilizing a countback days sales outstanding calculation.

21. The non-transitory computer readable medium of claim 17 wherein the days sales outstanding figure is calculated utilizing a best possible days sales outstanding.

22. The non-transitory computer readable medium of claim 17 wherein the assessment result report includes an improved days sales outstanding assessment.

23. The non-transitory computer readable medium of claim 17 wherein the assessment results report yields a number of day improvement to overall days sales outstanding.

24. The non-transitory computer readable medium of claim 17 wherein the second set of information indicative of a desired number of days of improvement of overall days sales outstanding.

25. The non-transitory computer readable medium of claim 24 wherein the assessment results report yields an improvement potential for each category of data of the accounts receivable.

26. The non-transitory computer readable medium of claim 25 wherein a modification of the improvement potential for a category of data will result in an adjustment of all other categories of data.

27. The non-transitory computer readable medium of claim 26 wherein two or more improvement potentials for a category of data is modified which will result in an adjustment of all other categories of data.

* * * * *